March 5, 1963 R. W. DICKINSON 3,080,308
SIMPLIFIED SODIUM GRAPHITE REACTOR SYSTEM
Filed Nov. 27, 1959 4 Sheets-Sheet 1

INVENTOR.
ROBERT W. DICKINSON
BY
A. Fridrich Namann
ATTORNEY

March 5, 1963    R. W. DICKINSON    3,080,308
SIMPLIFIED SODIUM GRAPHITE REACTOR SYSTEM
Filed Nov. 27, 1959    4 Sheets-Sheet 2

INVENTOR.
ROBERT W. DICKINSON

BY
ATTORNEY

INVENTOR.
ROBERT W. DICKINSON

BY
ATTORNEY

March 5, 1963 R. W. DICKINSON 3,080,308
SIMPLIFIED SODIUM GRAPHITE REACTOR SYSTEM
Filed Nov. 27, 1959 4 Sheets-Sheet 4

INVENTOR.
ROBERT W. DICKINSON
BY
ATTORNEY

United States Patent Office 3,080,308
Patented Mar. 5, 1963

3,080,308
SIMPLIFIED SODIUM GRAPHITE REACTOR
SYSTEM
Robert W. Dickinson, Van Nuys, Calif., assignor, by mesne assignments, to the United States of America as represented by the United States Atomic Energy Commission
Filed Nov. 27, 1959, Ser. No. 855,798
1 Claim. (Cl. 204—193.2)

The present invention relates to an improved sodium or graphite-type nuclear power reactor, and more particularly to an improved sodium graphite reactor system having an improved simplified primary heat exchange system.

For a description of current sodium graphite reactors, reference is made to the papers of William E. Parkins and Chauncey Starr appearing in volume 3 of the "Proceedings of the International Conference on the Peaceful Uses of Atomic Energy," held at Geneva, Switzerland in August 1955, available from the United Nations' Bookstore, New York, N.Y., and "Sodium Graphite Reactors," Chauncey Starr and R. W. Dickinson, Addison-Wesley Publishing Co., Reading, Massachusetts (1958). The sodium graphite reactors described therein have a core comprising a plurality of hexagonal graphite logs clad with a protective metal. Fuel elements are positioned in a central process channel in the individual moderator elements, and sodium flows through the process channel to remove fission heat. Sodium is pumped by conventional centrifugal pumps with modified shaft seals. The shafts are sealed against sodium leakage by freezing off an annulus of sodium around the shaft, and as the shaft turns it continuously shears the solid sodium in the annulus. The trouble areas with the shaft seal have been shaft binding, solid sodium extrusion, and gas in-leakage into the sodium system. The sodium is pumped through a primary cooling circuit external to the core vessel and is there coupled to a secondary sodium loop by means of sodium-to-sodium shell and tube heat exchanger. The secondary sodium loop then goes through a once-through steam generator. The reason for the intermediate heat exchange system is to prevent possible contamination of the turbine by radioactive sodium-24, and also to prevent the formation of nascent oxygen and hydrogen in the boiler by the action of gamma ray-emitting sodium-24; such nascent gases are considered to be a source of accelerated corrosion in steam generators and steam superheaters.

The current generation sodium graphite reactors have operated well and reliably, and have established the fundamental technical feasibility of the particular reactor concept. However, the present sodium graphite reactors have high capital costs due to their core design and complex cooling systems. The development of economical nuclear power from this reactor type requires the achievement of higher performance and the reduction of capital costs. Furthermore, experience has indicated three broad areas in which sodium graphite reactors may be improved. Thermal stress problems, induced by the superior heat transfer properties of sodium have occurred; accessibility limitations created by the induced radioactivity of sodium-24 have been demonstrated; and neutron economy has been somewhat impaired by the presence of mild neutron poisons in the moderator volume of "canned moderator" reactors.

Thermal stress problems are centered about discontinuities in reactor and system structure. Nozzles, tube-to-tube sheet attachments in heat exchangers, and relatively massive components such as valves, pump volutes, etc., are principal offenders. Generally, these difficulties result from the slow response of heavy-walled metal sections to rapid temperature transients at the surface of these components. The rapidity with which power changes can be effected in a nuclear reactor, combined with the high film heat transfer coefficients associated with liquid metal, permits temperature transients as high as 70° F. per second in the flowing stream.

The accessibility problems in current sodium graphite reactors are created by the irradiation of sodium in the reactor which produces sodium-24, an isotope which decays by emission of a 2.73 mev. gamma with a 15-hour half-life. Components immersed in radioactive sodium will be contaminated with this material when withdrawn and, therefore, direct contact maintenance must await decay of radioactivity for a period of from four to ten days depending on the sodium activity level and urgency of repairs. Thus, it is obvious that the number of components which might require maintenance, and which are in contact with radioactive sodium, should be minimized.

Improvements in neutron economy can be achieved in the core by removing poisons which result in parasitic neutron absorption. The "canned moderator" design currently employed is based on the ability to remove sections of moderator material in case of failure of the cladding which separates the sodium from each graphite section. An improvement over this design has been achieved by a new design which contains the graphite in one mass, and in which fuel elements are suspended within process tubes which pierce the unclad graphite. This is the so-called calandria core, which is described more fully in co-pending patent application S.N. 757,173, filed August 18, 1958 in the names of Robert M. Peterson, J. E. Mahlmeister, N. E. Vaughn, W. J. Sanders, and A. C. Williams, the disclosure of which is incorporated herein by reference.

An object of the present invention, therefore is to provide an improved sodium graphite reactor system.

Another object is to provide an improved sodium graphite reactor system of advanced design from a mechanical and heat transfer standpoint.

Another object is to provide an improved sodium graphite reactor having a simplified primary heat exchange loop.

Another object is to provide such a reactor wherein said loop is contained within the primary reactor structure, rather than external thereto.

Still another object of the present invention is to provide an improved sodium graphite reactor wherein direct maintenance is not hindered by radioactive sodium.

Still another object is to provide an improved sodium graphite reactor wherein the complexity of the primary heat exchange system, the number of components requiring maintenance, and the components in contact with radioactive sodium are significantly reduced.

Yet another object of the present invention is to eliminate all thermal stress-producing nozzles, piping, valves, and heat exchanger shells.

Further objects and advantages of the present invention will become more apparent from the following detailed description taken together with the accompanying drawings, hereby made a part of the specification, wherein.

Figure 1:
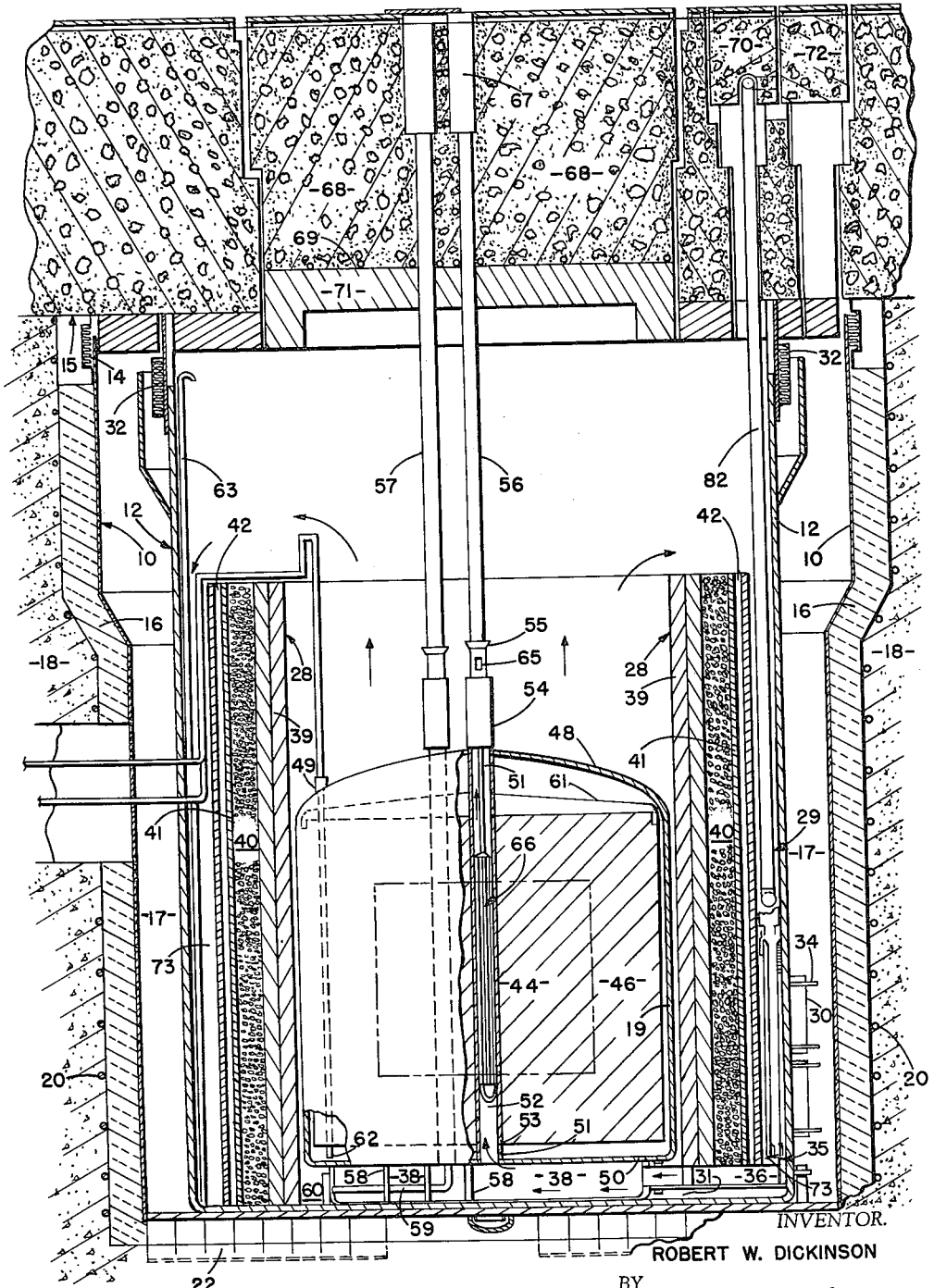
FIG. 1 is a vertical section of one reactor core embodiment of the invention.

The advanced sodium graphite reactor of the present invention comprises basically a calandria core vessel in conjunction with a simplified, overflow-type primary sodium system. In the calandria core vessel, which is described fully and claimed in the above referenced co-pending application, the graphite moderator is contained within this stainless steel vessel. The tubes which form the fuel element channels pass through close-packed hexagonal graphite logs and are welded to the upper and lower ends of the calandria. Differential thermal expansion of the tubes is provided for by means of bellows at the top of each tube. This design avoids the use of individually canned moderator elements, resulting in improved neutron economy and lower core fabricating costs.

In the primary sodium system of the present invention the primary sodium is pumped upward through the core into a top sodium plenum. Sodium from the top plenum "overflows" a baffle downward through an intermediate heat exchanger, which is located in the annular region around the calandria vessel within the primary reactor enclosure. The sodium is returned to a lower plenum under the reactor core by means of convective flow and/or electromagnetic pumps. Thus, all of the primary sodium system is confined to the reactor vessel, eliminating piping and galleries for the primary system. Stress-producing nozzles, piping, valves, and a primary heat exchanger shell are thereby also eliminated. Maintenance is considerably facilitated because most primary (radioactive) system components have been eliminated. The only portion of the primary system which is in contact with the primary coolant is the intermediate heat exchanger; reliability of this component is enhanced by its inherently low stress design and the fact that removal for repairs can be made without disconnecting the primary sodium pipe fittings, as will be described below.

The following summary of reactor specifications for the preferred embodiment is given as an example of the system utilizing the present invention.

Summary of Reactor Specifications

| | |
|---|---|
| Reactor thermal power, Mwe. | 255. |
| Reactor coolant | Sodium. |
| Coolant inlet temperature | 625° F. |
| Coolant outlet temperature | 1200° F. |
| Coolant flow, lb./hr. | $12 \times 10^6$. |
| Number of primary loops | 3. |
| Secondary coolant | Sodium. |
| Coolant inlet temperature | 575° F. |
| Coolant outlet temperature | 1150° F. |
| Coolant flow, lb./hr. | $12 \times 10^6$. |
| Fuel | 19-rod cluster of ½ inch diameter by 1 inch UC pellets in stainless steel tubes with sodium bond. |
| Number of fuel elements | 151. |
| Number of control-safety rods | 18. |
| Initial enrichment | 2.5%. |
| Initial excess reactivity with equilibrium xenon and samarium poison | 0.093. |
| Initial conversion ratio | 0.54. |
| Average fuel burnup | 15,000 Mwd./metric ton. |
| Uranium in core | 16,200 kg. |
| System inventory | 26,000 kg. |
| Active core size (diameter, height) | 12 ft. x 12 ft. |
| Peak-to-average power ratio | 3.15. |
| Specific power (average for new core) | 1515 kw./kg. $U^{235}$. |
| Maximum fuel temperature | 2250° F. |
| Average heat flux | 432,000 B.t.u./hr.-ft.² |
| Maximum heat flux | 1,360,000 B.t.u./hr.-ft.² |
| Average thermal neutron in fuel | $8 \times 10^{13}$ n/cm.²-sec. |
| Refuel cycle | 10 months. |
| Pumping power requirements: | |
| Primary pumps | 3300 H.P. |
| Secondary pumps | 2500 H.P. |
| Cooling water pumps | 1600 H.P. |
| Feedwater pumps | 11,000 H.P. |
| Heat exchange surface requirements: | |
| Intermediate heat exchangers | 38,000 sq. ft. |
| Steam generators | 70,000 sq. ft. |
| Reheaters | 8,000 sq. ft. |

The preferred embodiment of the present invention is shown in FIG. 1 and comprises a containment vessel 10 which encloses the reactor vessel 12 and has a bellows seal 14 between the containment vessel 10 and the cavity liner 15 to maintain a nitrogen atmosphere and provide for thermal expansion. Ballast tanks, not shown, are located in the annular space 17 between the reactor vessel 12 and the containment vessel 10. If leaks should occur in the reactor vessel 12, the sodium is retained by the containment vessel 10 at the level necessary to assure natural circulation to remove afterglow heat. The carbon steel ballast tanks are filled with rock ballast and sealed.

Surrounding and attached to the walls of the containment vessel 10 is one foot of insulation 16. The heat generated in the concrete 18 and any heat conducted across the insulation is removed by cooling coils 20 embedded in the concrete. A cadmium sheet 0.020 inch thick lines the inside surface of the concrete shield and is used to reduce back scatter of neutrons thermalized in the concrete.

Figure 2:
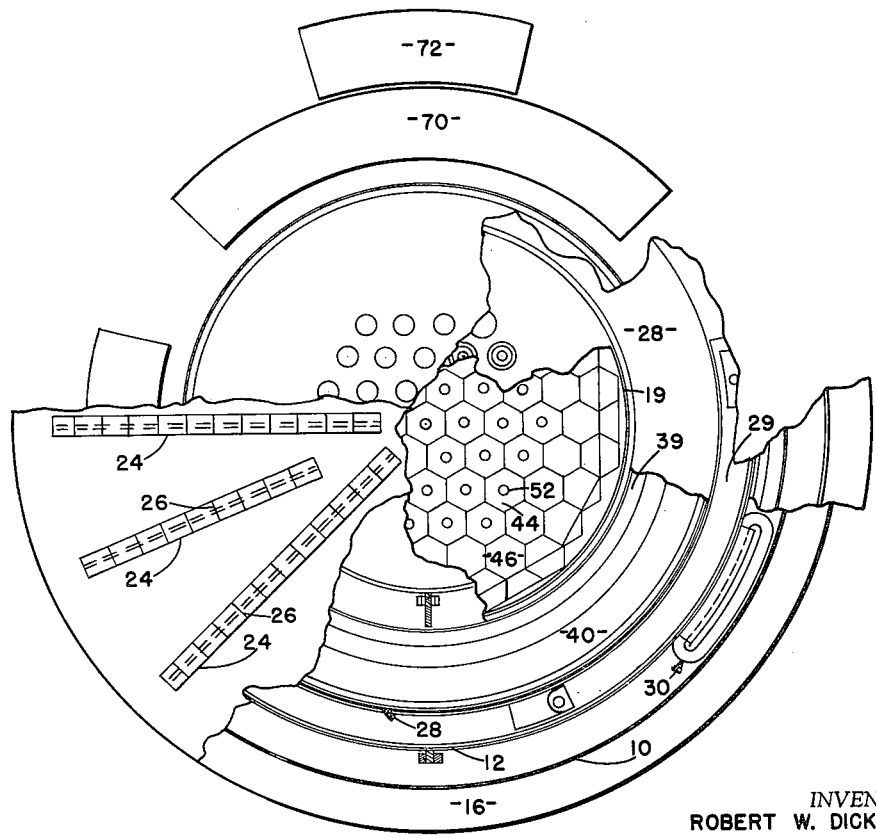
FIG. 2 is a partially sectioned plan view of the reactor core.

A support structure 22 is provided for the containment vessel 10 which, in turn, supports the reactor vessel 12 and calandria vessel 19. This support consists of a plurality of 16 inch wide flange structural steel beams 24 positioned on a radial pattern beneath the calandria vessel. See FIG. 2. Vertical slots 26 cut in the beams allow for differential expansion between the concrete and containment vessel.

The stainless steel reactor vessel 12 contains the calandria vessel 19, neutron shield 28, intermediate heat exchanger 29, and the non-electrical electromagnetic pump structure 30.

At the top, a bellows 32 seals the reactor vessel 12 to the cavity liner 15 to prevent sodium vapor and the nitrogen atmosphere from escaping. It also allows for thermal expansion and contraction of the reactor vessel. Support for the nine electromagnetic pumps 30 is provided by stainless steel frames 34 welded to the walls of the reactor vessel. These supports also serve as guides so that the pumps may be installed or removed from the reactor floor level. A pump discharge plenum 35 is located directly under each pump and nine 12 inch diameter stainless steel outlet nozzles direct sodium flow from the pump discharge plenum 35 through the calandria inlet pipe 36 to the inlet plenum 38 under the calandria vessel 19.

The neutron shield, indicated generally at 28, is spaced from the vessel 12 and surrounds the calandria vessel 19. Nine slots 31 in the bottom of the shield 28 provide passage for the coolant pipes 36 to the inlet plenum 38. The bottom of the tank is ¾ inch thick and the top is of 16 gauge material to allow for any differential expansion between the inner wall and the outer wall. Tank material is stainless steel and of all-welded construction. This tank 28 is filled with 10 inches of carbon steel 39 adjacent to the inside wall followed by 8½ inches of titanium hydride aggregate 40 and ¾ inch thick 1% boron steel 41. These shield components extend the height of the annular tank. The remaining voids 42 are filled with sodium to transfer heat generated by the shielding materials to the walls of the annular tank. The iron 39 in the neutron shield serves to attenuate neutrons of energies greater than one mev. by elastic scattering and to absorb thermal energy neutrons from the core and reflector. Titanium hydride 40 is used to moderate epithermal neutrons and the boron steel 41 absorbs neutrons thermalized by the titanium hydride.

The calandria vessel which contains the moderator 44 and reflector logs 46 is 16.5 feet in diameter by 19 feet high. The dish-shape top head 48 and the vessel shell walls are ¾ inch thick and the bottom head 50 is 1 inch thick. Each head contains 187 nozzles on a 10 inch triangular spacing. An additional nozzle 49 for a vent and pump-out line 62 is located in the top head. The vessel 19, inlet plenum 38, and process channel 52 are made of type 304 stainless steel and are of all-welded construction. The graphite moderator logs are hexagonal in cross section with holes centered axially for the process channels. Pedestals 53, which are integral parts of the bottom head nozzles 51, support the individual graphite logs at the bottom and each log is located at the top by the top nozzles.

The graphite reflector logs are identical to the moderator logs except that the center hole is omitted. These logs are located and supported at the bottom on dummy nozzles and pinned at the top to each other and to the adjacent moderator logs.

Each process channel consists of a process tube 52, bellows and bellows guard 54, and entry guide 55. The process tubes extend from the bottom head nozzle through the top head nozzle 51 and are welded to bellows 54. Bellows are provided between the process tubes in the top head nozzles to allow for differential thermal expansion between the calandria vessel and the process tube. Guards surrounding the bellows are used to stagnate sodium and reduce thermal shocks. An entry guide 55 extends above the process tube and provides a channel for inserting the orifice tubes in control rod thimbles 57. Of the 187 process channels, 168 are available for fuel and one for the neutron source; the remaining 18 are for the combination control and safety elements.

An inlet coolant plenum 38 below the calandria vessel 19 provides coolant flow distribution through the 168 fuel channels. This plenum is a short cylindrical tank of one inch thick stainless steel and is welded to the calandria vessel.

Sodium within the inlet plenum is under a 40 p.s.i. internal pressure. To carry this pressure load the bottom of the inlet plenum and bottom of the calandria vessel are tied together with one inch diameter rods 58 on a triangular spacing.

Control rod channels are identical to the fuel channels except for the individual 2 inch stainless steel pipes 59 which extend from the inlet nozzle of the calandria vessel across the mixing plenum 38 into the static pool of sodium 60 surrounding the calandria vessel 19. This arrangement permits natural convection cooling of the control rods.

The graphite 44 and 46 is protected from contact with liquid sodium in the event of minor leaks in the calandria top head or in the process tubes. Sodium leaking through the top head or bellows is kept away from the graphite by means of a shroud 61 which consists of a conical steel head 15.3 feet in diameter by $5/16$ inch thick. Drain tubes of zirconium separate the graphite from the process tubes. Any sodium which leaks into the calandria vessel is drained to the bottom of the vessel without wetting the graphite. A two inch pump-out line 62 removes accumulated sodium.

To maintain a static helium atmosphere inside the calandria vessel a two inch stainless steel vent and fill line 63 is provided. The calandria vessel is pressurized to approximately 10 p.s.i. with helium gas. A small amount of helium is bled intermittently through a detector line which extends to the calandria bottom. In the event of a sodium leak, the sodium would eventually cover the end of the detector line stopping gas flow and begin filling with sodium. The resultant pressure difference between the vessel and detector line would automatically start the pumping system to remove the leakage.

The preferred fuel assembly 66 consists of a cluster of 19 fuel rods, an intermediate hanger rod, and a shield plug 67. The assembly hangs in the process channel, supported by the top shield 68 which serves as a loading face. The fuel rods consist of 0.5 inch diameter uranium-carbide slugs, sheathed in 0.52 inch I.D x 0.01 inch thick wall stainless steel jacket. The rods are approximately 14 feet long with the lower 12 feet containing the fuel slugs and the remaining 2 feet providing space for fission gas release. A sodium bond is used between the uranium-carbide slugs in the jacket. End caps welded to the jacket seal the uranium-carbide slugs in the sodium under an inert gas.

Each fuel element is suspended from the loading face shield 68 by a shield plug 67. The shield plug consists of a cylindrical steel shell stepped at the mid plane of the shield section for support and to minimize radiation streaming. Thermal insulation is provided by filling the lower end of the plug with 12 inches of stainless steel wool. Six inches of steel shot radiation shielding is placed directly above the steel wool and dense concrete fills the remaining space to the floor level.

An orifice tube 56 extends from the floor level down through the loading face shield 68 and into each of the calandria entry guides. This orifice tube serves three purposes: (1) acts as a guide when inserting and removing fuel elements; (2) provides a means of bearing the coolant flow past the fuel elements by incorporating a variable orifice in the process channel; and (3) the tube provides support for two thermocouple wires that are used to measure the outlet sodium temperature of each process channel. The orificing of coolant flow is accomplished by a rectangular opening 65 in the orifice tube 56 which is located vertically to match a triangular shaped opening in the calandria entry guide. Effective orifice area or coolant flow is varied by rotating the orifice tube by means of a spanner wrench from the reactor floor.

The side walls of the reactor cavity support the loading face shield 68, heat exchanger removal plug 70, and pump remover plug 72, all of which fill the opening and seal the cavity from the reactor room. Surfaces of the loading face shield and remover plugs are on the same level and form a portion of the reactor room floor. The radial neutron shield 28 around the calandria core 19 shields the secondary sodium in the heat exchanger 29 from neutrons.

Primary sodium is completely contained within the reactor vessel 12. Three intermediate heat exchangers 29, equally spaced in the annulus 73 between the neutron shield and the reactor vessel wall 12 transfer heat from the reactor to the non-radioactive secondary sodium. Nine electromagnetic pumps 30, three per heat exchanger, circulate the primary sodium up through the calandria core. Sodium from the calandria core (at 1200° F.) enters a pool above the core and flows over the neutron shield wall 28 down past the heat exchanger 29 where the primary sodium transfers its heat to the secondary sodium. The sodium leaves the heat exchanger at 625° F. and flows into the suction side of the electromagnetic pumps 30. It is then discharged to nine pipes 36 into the inlet plenum 38 below the calandria core.

Nine primary sodium pumps are designed to pump sodium at 625° F. against a head of 40 p.s.i. at a rate of 3400 g.p.m. Each pump consists of a laminated silicon steel core on the inside of the reactor vessel wall and a laminated silicon steel core and coil structure mounted directly opposite on the outside of the reactor vessel wall. The pump throat is formed by the reactor vessel and the internal laminated core with a ¾ inch annular gap.

Figure 3:
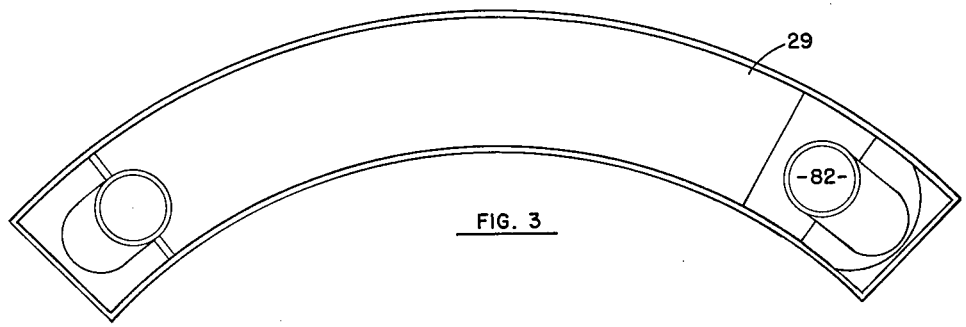
FIG. 3 is a top view of a heat exchanger.

Three single path counterflow-type heat exchangers 29 (see FIG. 3) transfer heat from the primary sodium system to the secondary sodium system. Primary sodium at 1200° F. enters the shell side of each heat exchanger 29 to eleven calibrated orifices 80 sized to provide a 20 inch head differential of sodium when operated at designed rated power. See FIG. 4. Six exit nozzles 81 located at the bottom of each heat exchanger direct the primary sodium to three electromagnetic pumps 30 operating in parallel. A pump inlet plenum is provided at the suction side of the pump to channel the sodium flow from the heat exchanger into the pump throat. This plenum has two 8½ inch diameter nozzles which meet with the heat exchanger exit nozzles. These nozzles are fastened to the pump plenum by a labyrinth type seal to allow for a possible misalignment of the pump inlet plenum and the heat exchanger, and also to permit movement caused by thermal expansion.

Figure 4:
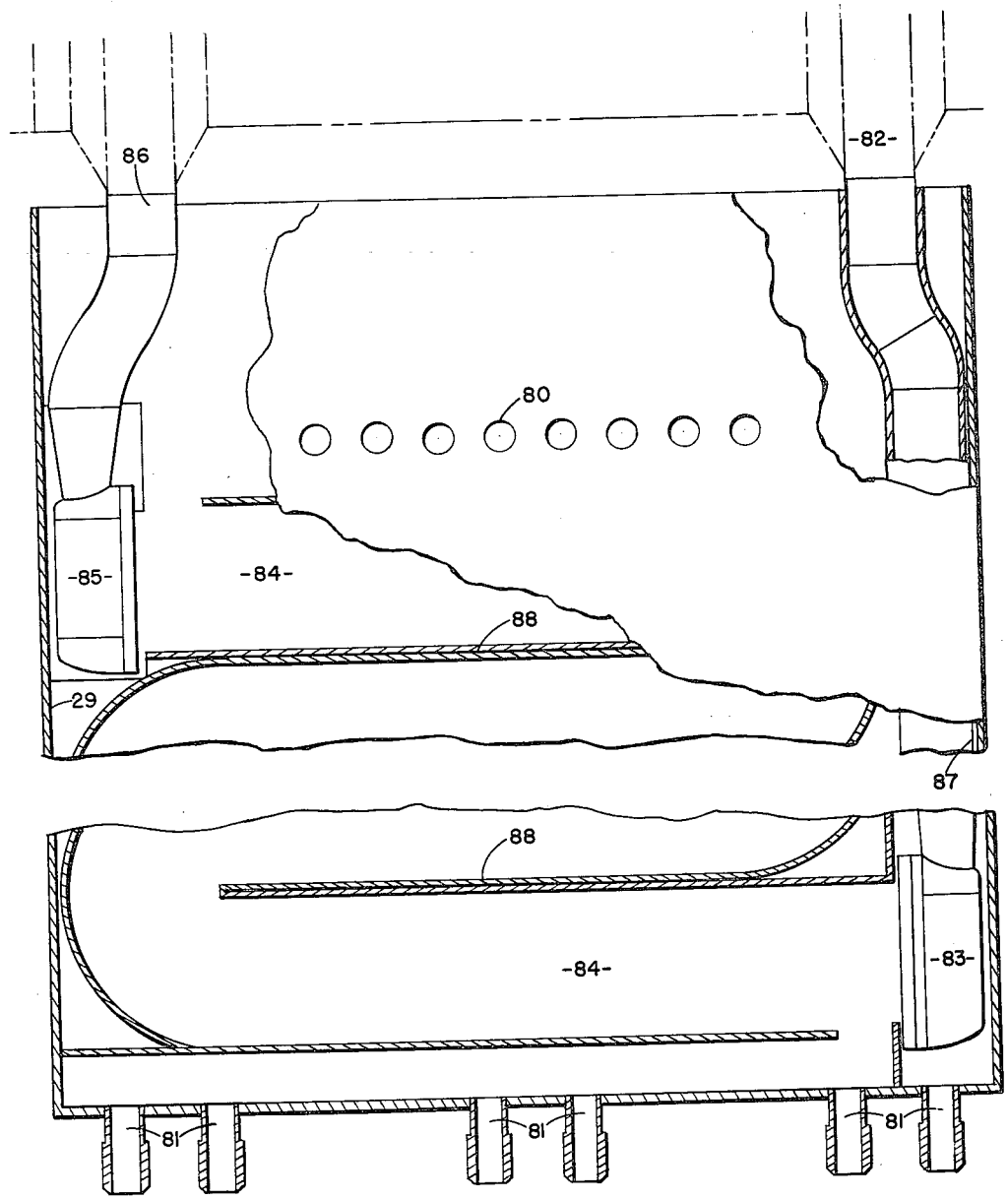
FIG. 4 is a section through FIG. 3.

The secondary sodium enters the cavity through heat exchanger removal plug 30 and inlet pipes 82. Inlet pipe 82 terminates at the bottom of the heat exchanger in a header 83 and flows upward through 675 one inch diameter tubes 84 to a header 85 at the top. The bundle of tubes 84 are bent into a series of U-bends with a baffle 88 between the bends. The headers at each end of the tubes support the tubes which are otherwise free to expand. The preferred embodiment of the heat exchanger 29 is shown in FIG. 4 although other useful types will be apparent to those skilled in the art. The header 85 is connected to a secondary sodium outlet pipe 86 which extends upward into the shield plug and then to a steam-producing or process heat-utilizing facility.

Figure 5:
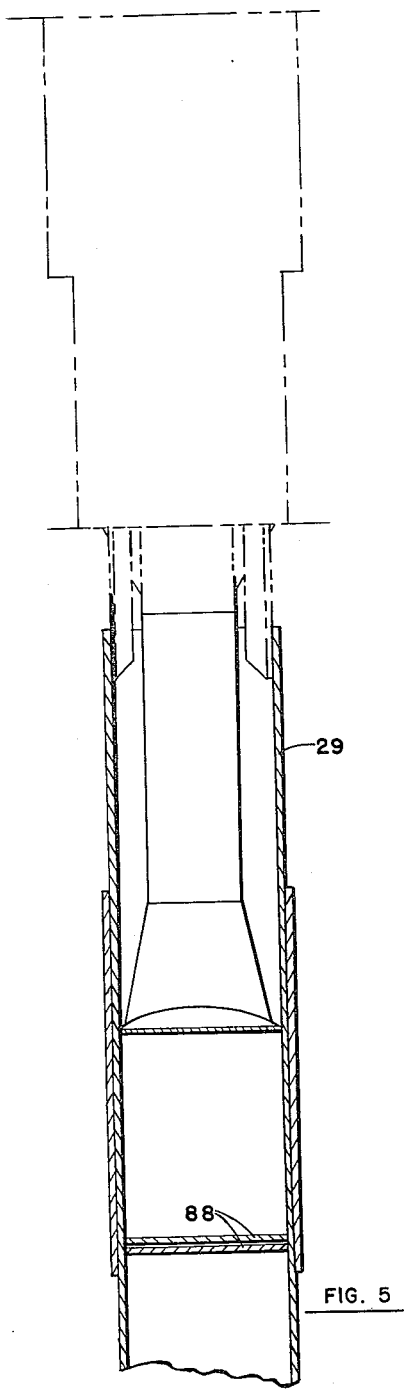
FIG. 5 is a side view of the upper portion of FIG. 4.
Figure 6:
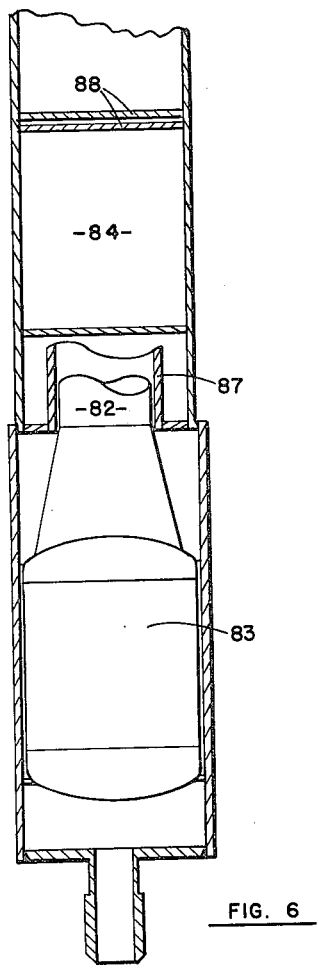
FIG. 6 is a side view of the lower portion of FIG. 4.

FIGS. 5 and 6 show a cross section of the heat exchanger of FIG. 4. Inlet pipe 82 is surrounded by shield pipe 87 which extends the length of the heat exchanger 29 and upward through the shield plug. Each of the three heat exchanger plugs is removable and consists of two sections. The bottom section includes the heat exchanger, bottom shield plug, and gas seal. Secondary sodium piping that extends from the heat exchanger up into the bottom shield plug is covered with insulation and is enclosed in a large diameter guard pipe. The top shield section covers the heat exchanger piping that extends above the bottom section into the secondary piping trenches.

Both the top and bottom sections are made of dense concrete encased in type 405 stainless steel forms. Steps are suitably placed to prevent radiation streaming, and also provide a ledge for support. Cooling coils embedded in lead remove any heat generated in the concrete or conducted across the thermal insulation. The laminated core and coil structure of the individual electromagnetic pumps is accessible through step openings in the biological shielding that covers the reactor area. These openings are filled by plugs which are similar in construction to the heat exchanger plugs.

The location of the intermediate heat exchangers 19 within the reactor vessel but protected from the core by a radiation shield 28 provides numerous advantages not attainable in the prior art reactor systems using externally located heat exchangers. These advantages include: (1) A significant reduction in shielding since the radioactive coolant is confined within the normal reactor shielding; (2) A significant reduction in components such as valves, monitoring equipment, and piping with resulting space savings; (3) The secondary coolant is shielded from the core radiation; (4) There is less heat transfer to the shielding since the major portion of the high temperature sodium is confined to the central volume of the reactor; (5) In the event of pump failure, natural convection circulation of the sodium can be relied upon to remove afterglow heat since the level of the sodium coolant is above the top extremity of the shield 28 and a natural convection circulation path is present within the reactor vessel; and (6) The intermediate heat exchanger is removably supported from the top shield for ease in maintenance and to facilitate replacement.

Support for the calandria vessel 19, neutron shield 28, reactor vessel 12, and containment vessel 10 is provided by the reactor support structure 22 and concrete foundation. Accurate positioning of the core and shield is accomplished by keying them to the reactor vessel.

Located above the reactor core is the loading face shield 68. This shield plug is made of dense concrete encased in a type 405 stainless steel. Above the bottom surface is a 1½ inch thick layer of poured lead 69 in which water cooling coils are embedded. Thermal insulation 71 consisting of a plurality of horizontal stainless steel sheets 1/32 inch thick spaced one inch apart is suspended from the bottom surface of the shield plug 68.

The shield 68 also serves as a reactor fuel loading face with 187 openings located directly above the 187 process channels in the calandria vessel. Additional openings are provided for sodium level indicators and neutron instrumentation thimbles.

Although a particular embodiment of the present invention has been described, various modifications will be apparent to those skilled in the art. Therefore, the present invention is not limited to the specific reactor embodiment disclosed but only by the appended claim.

What is claimed is:

A nuclear power reactor comprising a reactor vessel, shielding means positioned at the top of said vessel, means sealing said reactor vessel to said shielding means, said vessel containing a quantity of sodium, a core tank, unclad graphite moderator disposed in said tank, means including a plurality of process tubes traversing said tank for isolating said graphite from said sodium, fuel elements positioned in said process tubes, said core tank being supported in spaced relation to the walls and bottom of said reactor vessel and below the level of said sodium, neutron shielding means positioned adjacent said core tank between said core tank and the walls of said vessel, said neutron shielding means defining an annular volume adjacent the inside wall of said reactor vessel, inlet plenum means below said core tank for providing a passage between said annular volume and said process tubes, heat exchanger means removably supported from the first-named shielding means and positioned in said annular volume, and means for circulating said sodium over said neutron shielding means down through said heat exchanger, across said inlet plenum and upward through said process tubes, said last-named means including electromagnetic pumps located outside said vessel and supported on said vessel wall and between said heat exchanger means and said inlet plenum means.

References Cited in the file of this patent

UNITED STATES PATENTS

| | | |
|---|---|---|
| 2,778,792 | Szilard | Jan. 22, 1957 |
| 2,841,545 | Zinn | July 1, 1958 |
| 2,910,417 | Teitel | Oct. 27, 1959 |
| 2,961,393 | Monson | Nov. 22, 1960 |
| 2,987,488 | Clark | June 6, 1961 |

OTHER REFERENCES

Atomics, Sept. 1957, pages 336–342.